United States Patent [19]
Hallock, III

[11] Patent Number: 5,482,194
[45] Date of Patent: Jan. 9, 1996

[54] FOLDING BICYCLE RACK

[76] Inventor: Orrin S. Hallock, III, 33 Roberts Rd., Cambridge, Mass. 02138

[21] Appl. No.: 165,678

[22] Filed: Dec. 13, 1993

[51] Int. Cl.⁶ .................................................. B62J 7/04
[52] U.S. Cl. ................................... 224/40; 224/33 R
[58] Field of Search ............................... 224/40, 33 R, 224/31, 37, 38, 39

[56] References Cited

U.S. PATENT DOCUMENTS

| 685,424 | 10/1901 | Main ................................... 224/40 |
| 4,410,116 | 10/1983 | Mattei ................................. 224/40 |

FOREIGN PATENT DOCUMENTS

| 383903 | 12/1912 | France ................................. 224/40 |
| 65407 | 6/1943 | Norway ................................. 224/40 |
| 101074 | 9/1923 | Switzerland ............................ 224/40 |
| 16180 | 7/1909 | United Kingdom ..................... 224/40 |

*Primary Examiner*—Renee S. Luebke

[57] ABSTRACT

A pair of rails (1) and a pair of legs (9) comprised of rods having mounts (2), (7), (8), (12) formed at equal increment. One end of the legs and one end of the rails are pivotally secured to a central tail piece (10). The free ends of the legs are pivotly secured to a bicycle to either side of a bicycle wheel. The mounts of the free ends of the rails are mountable either to the seat stays of a bicycle in a carrying position or parallel to the outside of the legs in a stored position, to the same mount as the legs.

1 Claim, 4 Drawing Sheets

FOLDING BICYCLE RACK

TECHNICAL FIELD

The present invention relates to bicycle racks for portaging luggage and other articles on a bicycle.

A bicycle rack is a great convienence when there is a need to portage goods on a bicycle, but can detract from esthetic visual appeal of a bicycle, and constant removal and installation of a rack is not desirable.

BACKGROUND ART

The background art is comprised of all manner of bicycle racks, that are rigidly secured to the frame of a bicycle.

DISCLOSURE OF INVENTION

The present invention is comprised of a folding rack for mounting over the wheel of a bicycle for portaging goods. The rack is comprised of an upper pair of parallel rack rails jointedly secured to the outside of a pair of rack legs. The outer ends of both the rack rails and the rack legs are secured to a bicycle, the rails to the seat stays or a front fork mounted support, and the legs to the dropouts supporting the rails above the wheel of a bicycle. The rails can be disconnected from the seat stays and folded down parallel to and fastened to the dropouts at the point that the legs are attached. The entirety of the folded down rack is pushed forwards to parallel the seat stays and therefixed by tightening the lower rack fasteners at the dropouts.

BEST MODE FOR CARRYING OUT THE INVENTION

Figure 1:
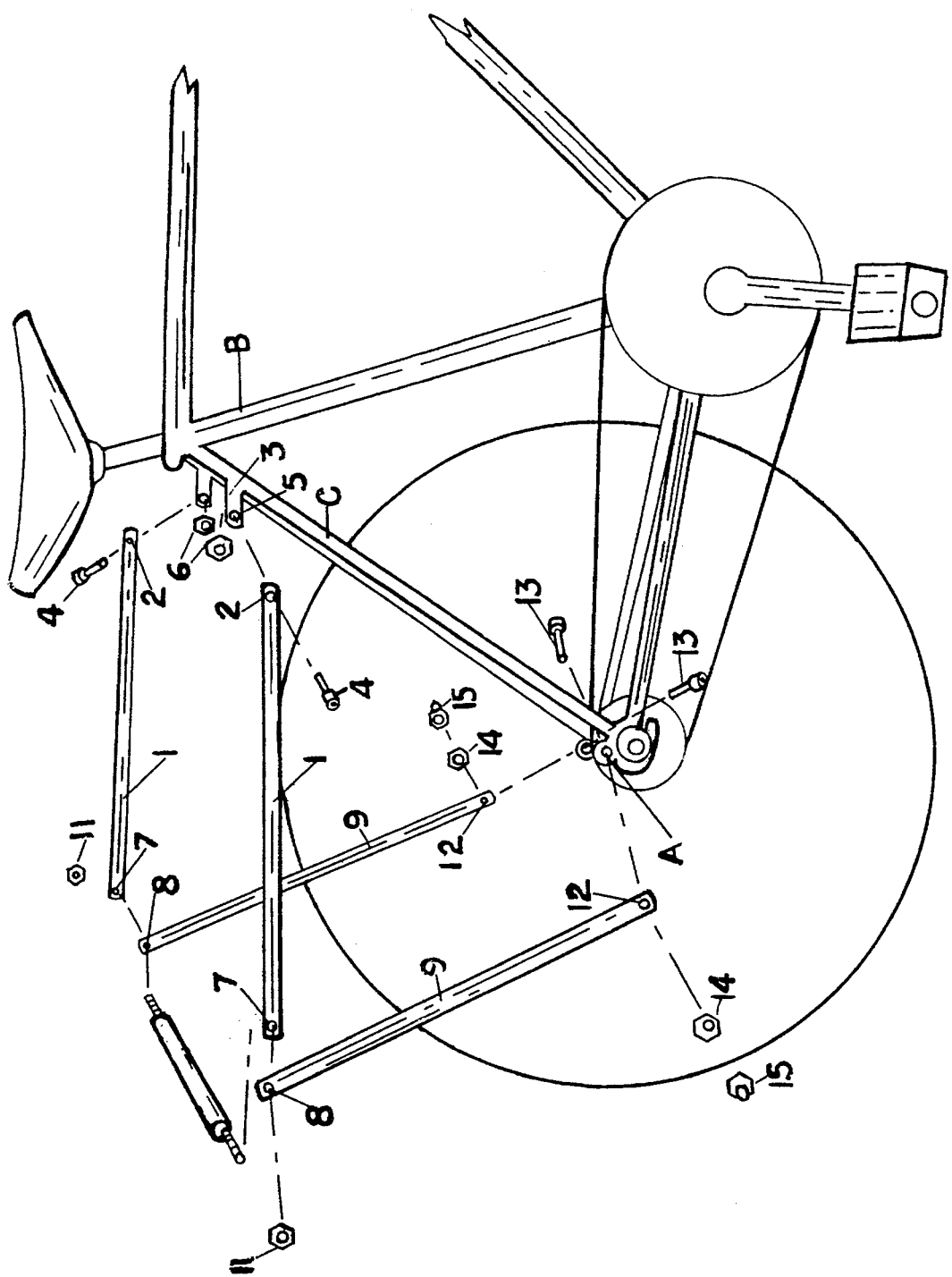
FIG. 1 is an exploded perspective of the present invention as viewed from the side.

Referring now to FIG. 1 by reference characters there is shown a folding rack for a bicycle comprised of a pair of upper metal rails 1 having mounting perforations 2 at one end. The perforations are used to mount the rails to a pair of rack mounts 3 brazed to the seat stays of a bicycle by rack rail mounting bolts 4 that are inserted through the mounting perforation of the rails and a mounting perforation 5 of the rack mounts theresecured by a nut 6 seating on the end of the bolt. The rearward ends of the rack are formed with a mounting perforation 7 that align to the outside of an upper mounting perforation 8 formed in the upper ends of a pair of metal rack legs 9. The rearward ends of the rack rails and the upper ends of the rack legs are secured to either side of the rack tail piece 10. The rack tail piece is formed of metal having a central spacer with a threaded end extending outward to either side. At least one rack tail piece fixing nut 11 is secured to the outside of each rack rail on the threaded end of the tail piece by peaning of the threaded end to prevent accidental loss. The tail piece fixing nuts are tightened to hold the desired position of the rack or loosened to transform the rack. The lower ends of the rack legs are formed with mounting perforations 12 for securing the rack by a rack leg securing bolt 13 that seats through a mounting perforation A molded on the rear dropout of a bicycle there secured by at least one nut 14. The end of the rack leg bolt has a cap nut 15 on the end thereof.

The present invention possesses the advantage of providing a folding light weight bicycle luggage rack, that can be down folded when not needed for esthetics and aerodynamics.

Figure 2:
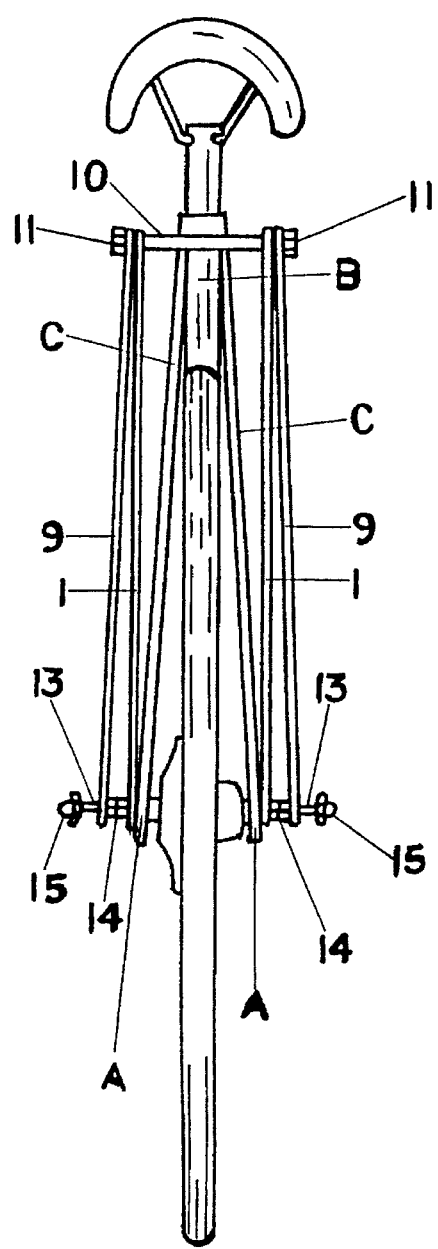
FIG. 2 is a rear view of the invention of FIG. 1 with the carrier in the stored position.

Referring now to FIG. 2 the difference is that the invention is shown in an up folded stored position from a rear view.

Figure 3:
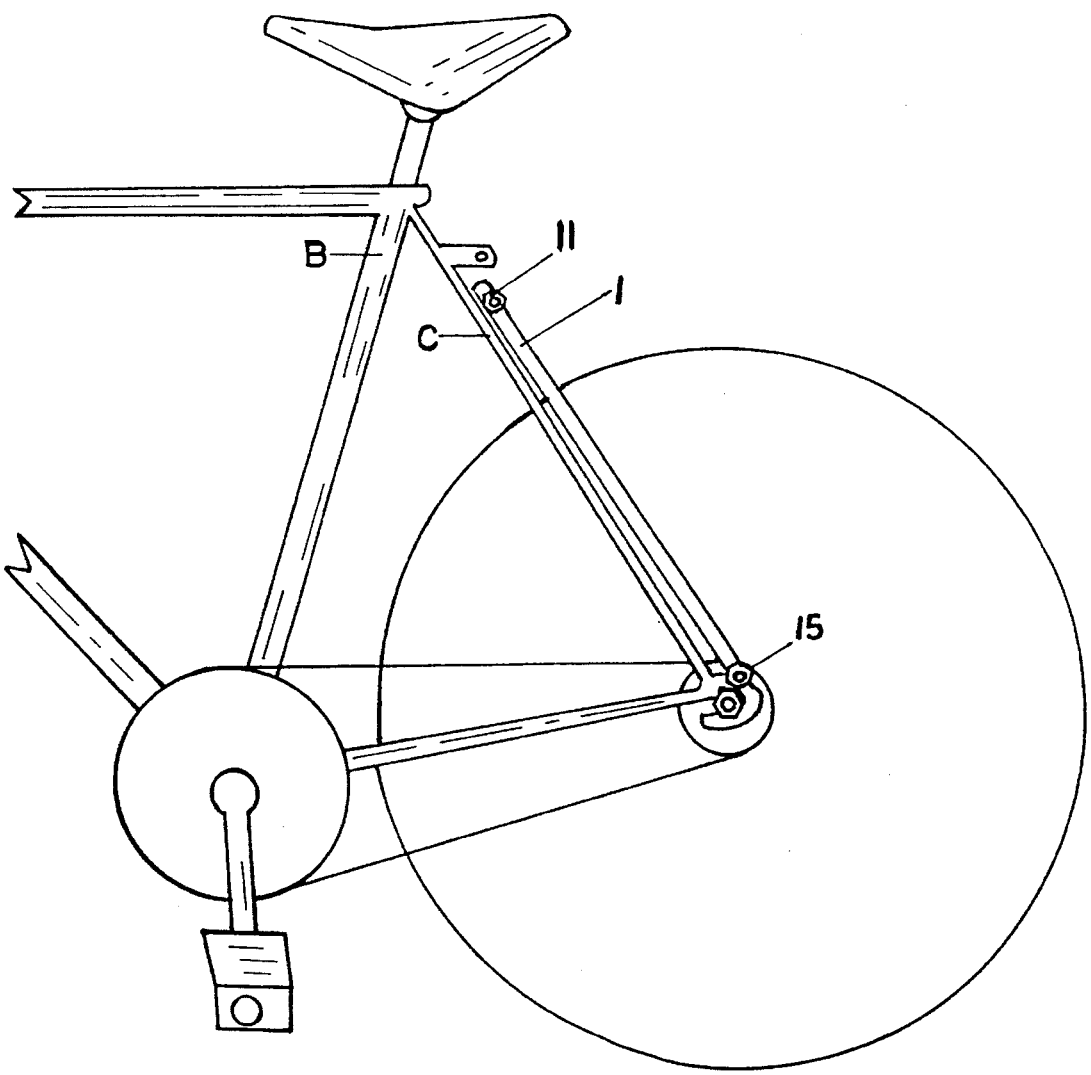
FIG. 3 is a side view of the carrier in the stored position.
Figure 4:
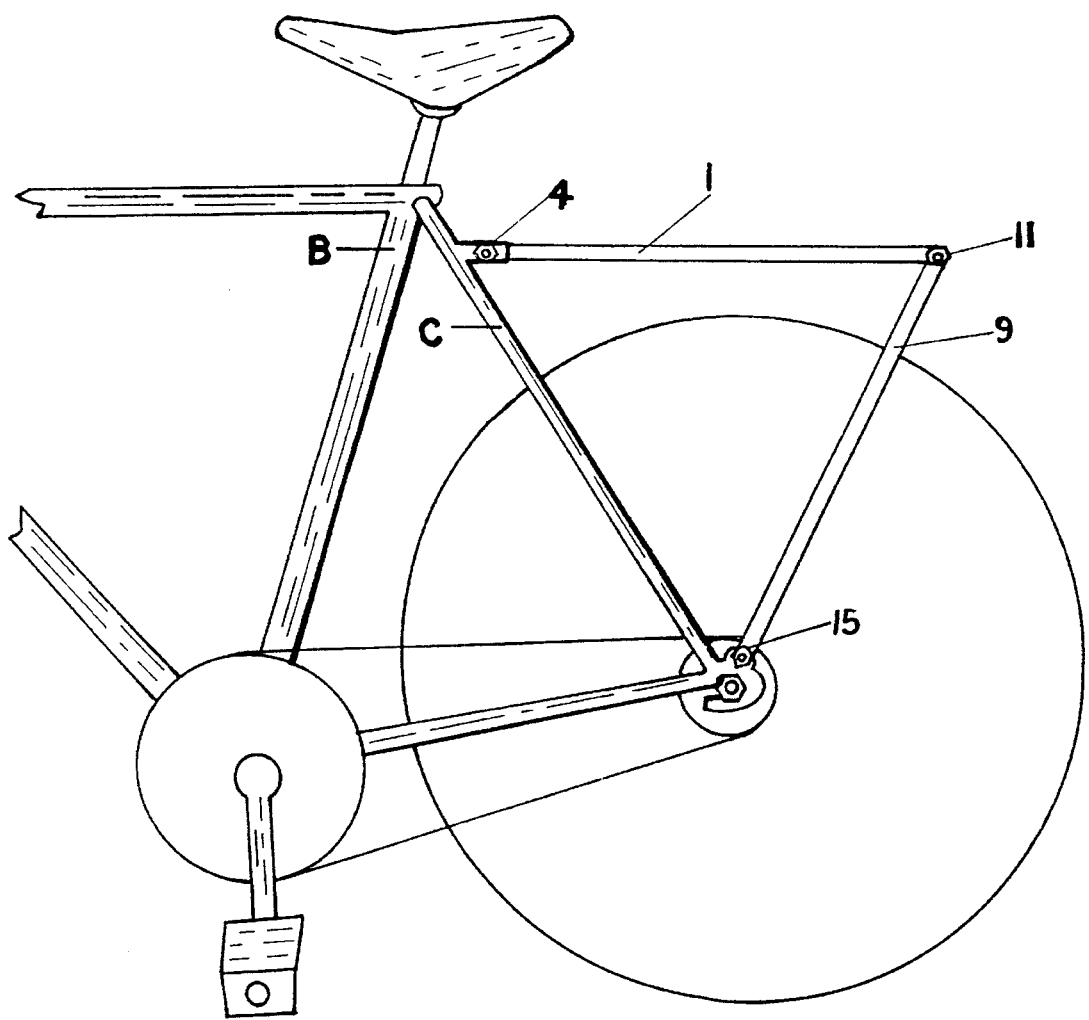
FIG. 4 is a side view of the carrier in the carrying position.

Referring now to FIG. 3 the difference is that the invention is shown from the side in an up folded stored position.

I claim:

1. A folding bicycle luggage rack for a bicycle having a wheel, said rack comprised of a pair of legs and a pair of rails, upper ends of said legs are pivotally secured to either end of a tail piece, pivotal ends of said rails are pivotally secured to either end of said tail piece outside of said upper ends of said legs, thereby providing a folding bicycle luggage rack wherein lower ends of the legs are secured to the bicycle to either side of the wheel, free ends of said rails are removably secured in one of two positions, a first carrying position in which the free ends of said rails are secured to seat stays of said bicycle providing a carrying platform for mounting and supporting articles on the bicycle, or a second storage position in which said free ends of said rails are secured outside of and parallel to said lower ends of said legs on either side of said bicycle wheel.

* * * * *